C. W. JOHNSON.
ANTISKIDDING DEVICE.
APPLICATION FILED NOV. 6, 1918.
1,309,326.
Patented July 8, 1919.
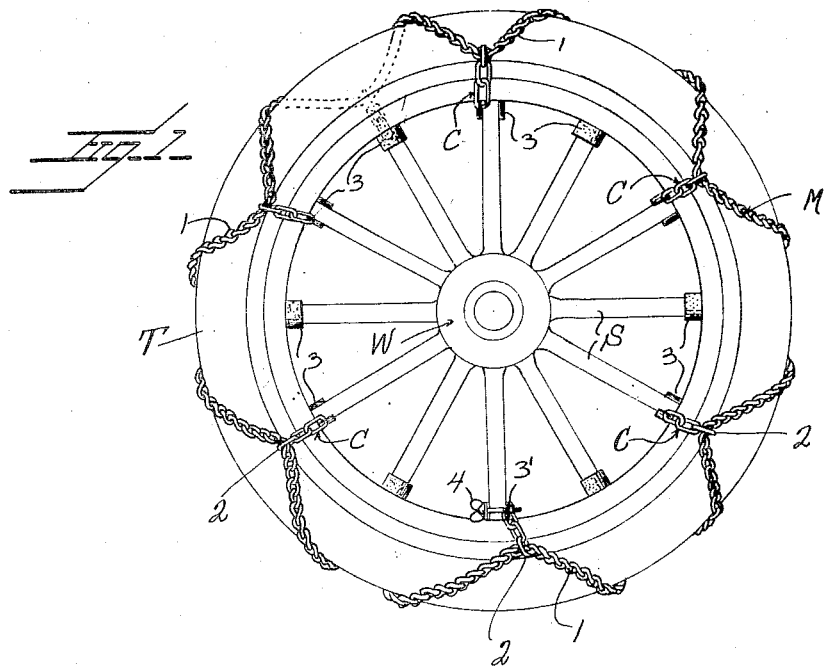
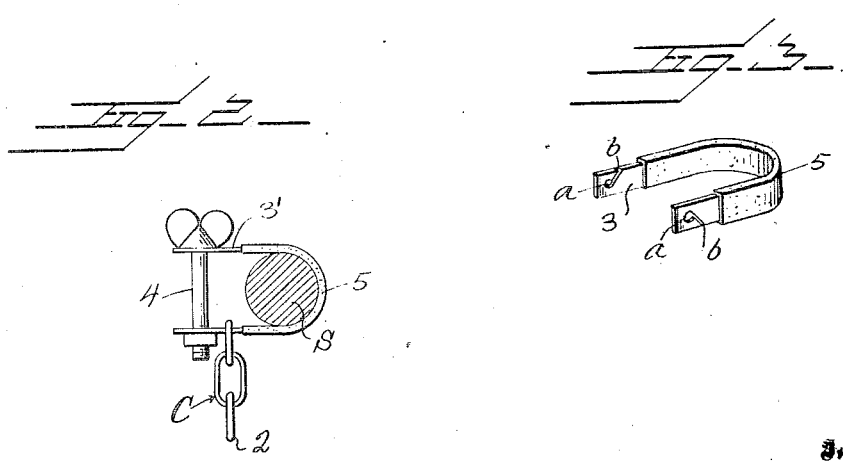
Inventor
C. W. Johnson
By Watson E. Coleman
Attorney

UNITED STATES PATENT OFFICE.

CHARLES W. JOHNSON, OF PASCO, WASHINGTON.

ANTISKIDDING DEVICE.

1,309,326.   Specification of Letters Patent.   Patented July 8, 1919.

Application filed November 6, 1918. Serial No. 261,339.

*To all whom it may concern:*

Be it known that I, CHARLES W. JOHNSON, a citizen of the United States, residing at Pasco, in the county of Franklin and State of Washington, have invented certain new and useful Improvements in Antiskidding Devices, of which the following is a specification, reference being had to the accompanying drawings.

This invention relates to certain improvements in anti-skidding devices, and it is an object of the invention to provide a novel and improved device of this general character which may be applied to the tire of a wheel in a manner to prevent effectually slipping or skidding of the wheel.

It is also an object of the invention to provide a novel and improved device of this general character comprisng an endless member engaged at intervals with the body of the wheel, and in a manner to cause the endless member to be disposed obliquely across the tread portion of the wheel body, and with adjacent oblique portions of the endless member disposed in angular relation.

An additional object of the invention is to provide a novel and improved device of this general character comprising an endless member engaged with the wheel body at circumferentially spaced points and in a manner to dispose the endless member in zig zag across the tread of the wheel together with means whereby a single point of engagement with the wheel body may be adjusted substantially radially of the wheel body to compensate for any slack which may be in the endless member when applied, so that said endless member may be properly fitted to the tire.

Furthermore, it is an object of the invention to provide a novel and improved device of this general character comprising an endless member adapted to be disposed in zig zag across the periphery of a tire, and wherein said member is secured at substantially fixed points spaced circumferentially of the wheel body, but permitting the endless member to creep lengthwise.

The invention consists in the details of construction and in the combination and arrangement of the several parts of my improved anti-skidding device, whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a wheel showing an anti-skidding device constructed in accordance with an embodiment of my invention applied thereto;

Fig. 2 is an enlarged fragmentary view partly in section and partly in plan illustrating in detail the adjustable clip as herein employed; and Fig. 3 is a view in perspective of one of the clips detached as herein embodied.

As disclosed in the accompanying drawings, W denotes a wheel body including the spokes S, and having fixed therearound a tire T.

My improved anti-skidding device comprises an endless member M formed preferably of chain, and having its links 1 twisted. At predetermined points the member M is loosely disposed through the outer links 2 of the branch or chain members C. The branch or chain members C are relatively short and the inner links of said members C, with the exception of one, are secured to a clip 3 or the like adapted to straddle the spokes of the wheel body W. The remaining member C has its inner link secured to a clamping clip 3′ coacting with a spoke of the wheel body.

As is clearly illustrated in the accompanying drawings, the clips 3 are alternately disposed in opposite directions so that the member M may be arranged in zigzag across the tread portion of the tire T, so that when my improved device is in applied position, the wheel W is held effectually against slipping or skidding.

The clip 3′ is adapted to be moved longitudinally of its spoke S, and the extremities of said clip have coacting therewith a clamping member 4 whereby said clip may be locked at different points longitudinally of the spoke. By adjusting this clip 3′ longitudinally of the spoke, any slack in the member M when applied to a tire may be readily and conveniently taken up.

Each of the clips 3 and the clip 3′ is covered with a lamination 5 of leather or the like so that the clips will not mar the spokes S when applied thereto.

The links 1 of the member M are of a size as to have sliding movement through the outer links 2 of the member C. This permits the member M to creep endwise without the member substantially changing its position upon the tire T. By permitting the member M to creep lengthwise all of the links 1 comprised therein will be given opportunity to function whereby life of the member M is materially prolonged. The extremities of each of the clips 3 and 3' are provided with the openings $a$ having in communication therewith the entrance slots $b$. The inner link of the member C is disposed through one of said openings $a$ and entrance to said opening $a$ is afforded by the slot $b$.

It is also to be understood that my improved device may be applied without the necessity of rotating the wheel or lifting the wheel from out of contact with the ground or other surface, as a portion of the member may be caused readily to straddle the portion of the peripheral surface of the tire in contact with the ground. This in itself is of advantage, as it allows the member M to have the proper amount of slack when the wheel is to be rotated provided the member M is adjusted tight upon the tire T when the wheel W is standing still.

It has also been fully established in practice that by having the member M disposed zigzag or diagonally across the tread portion of the tire T, the clips 3 are materially relieved from strain, and which is not true should the member M be disposed straight across the tread.

From the foregoing description, it is thought to be obvious that an anti-skidding device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. In combination with a wheel structure including spokes and a tire, an endless flexible member, branch members through which the flexible member is loosely directed, a clamping member carried by one of said branch members for adjustable connection with a spoke longitudinally thereof, members carried by the remainder of the branch members, each of said members being engageable with a spoke of the wheel structure, said branch members being arranged at opposite sides of the wheel structure, when in applied position, whereby the endless member is arranged in zigzag across the tread portion of the tire, the adjustment of the clamping member longitudinally of its coacting spoke compensating for slack in the flexible member to cause said flexible member to properly fit the tire.

2. As a new article of manufacture, an anti-skidding device comprising an endless flexible member, branch members through which said flexible member is loosely directed, substantially U-shaped clips adapted for engagement with the spokes of a wheel, the extremities of the clips being provided with openings, and entrance slots for the openings, said branch members fitting within said openings through the entrance slots.

3. As a new article of manufacture, an anti-skidding device comprising an endless flexible member, branch members through which said flexible member is loosely directed, and members adapted to straddle the spokes of a wheel, the branch members being secured to extremities of said last named members.

In testimony whereof I hereunto affix my signature in the presence of two witnesses.

CHARLES W. JOHNSON.

Witnesses:
EDWARD A. DAVIS,
J. W. MADDEN.

Copies of this patent may be obtained for five cents each, by addressing the "Commissioner of Patents, Washington, D. C."